United States Patent [19]
Bohme

[11] 3,768,912
[45] Oct. 30, 1973

[54] OPTICAL METHOD AND DEVICE FOR MONITORING MOVING BODIES
[75] Inventor: Rudolf Bohme, Goldach, Switzerland
[73] Assignee: Aktiengesellschaft Adolph Sauer, Arbon, Switzerland
[22] Filed: June 16, 1971
[21] Appl. No.: 153,530

[30] Foreign Application Priority Data
June 26, 1970  Switzerland.......................... 9715/70

[52] U.S. Cl. ............................. 356/199, 250/219 R
[51] Int. Cl. ...................... G01n 21/18, G01n 21/30
[58] Field of Search .................. 250/219 D, 219 FS; 356/199, 200, 237, 238, 210, 242; 350/103

[56] References Cited
UNITED STATES PATENTS
3,474,254  10/1969  Piepenbrink et al................. 356/200
3,459,240  8/1969  Erickson............................ 356/238

FOREIGN PATENTS OR APPLICATIONS
22,961  4/1962  Germany............................ 356/238

Primary Examiner—David Schonberg
Assistant Examiner—Conrad Clark
Attorney—John J. McGlew et al.

[57] ABSTRACT

The movement of a body is monitored by an optical method wherein a cone of light rays is reflected from a surface to a photosensitive element whenever the cone of rays is interrupted by a moving body or by an article carried on the moving body. A cone of light rays is emitted from a more or less or practical punctiform light source and reflected with unbroken and divergent impingement on a reversing reflector and the light reflected releases the signal on the photosensitive element.

4 Claims, 2 Drawing Figures

Patented Oct. 30, 1973

3,768,912

INVENTOR.
RUDOLF KARL BOHME
BY
John J. McGlew
ATTORNEY

OPTICAL METHOD AND DEVICE FOR MONITORING MOVING BODIES

BACKGROUND OF THE INVENTION

1. Field of the Invention

This invention relates in general to optical methods and devices and, in particular, to a new and useful optical method for monitoring moving bodies by means of the reflection of a cone of light rays from a reflective surface on the moving body and to a device for carrying out the method.

2. Description of the Prior Art

At the present time, there are known methods employing a light ray or a cone of light rays for actuating a signal upon the interruption of the light rays passing to a photosensitive element such as a photoelectric cell and this is accomplished by employing an opaque moving body. These methods have the disadvantage that the light source and the photosensitive element cannot be accommodated in the same housing, and this limits its applicability. They are not suitable for monitoring the condition of the moving bodies, for example, for monitoring the supply of material carried by a moving body such as a yarn supply on a shuttle bobbin in looms, etc.

In order to avoid the above disadvantages, a light barrier is used in conjunction with a cone of rays of light which are first aligned at least substantially parallel by means of a lens system ( a condenser ) and subsequently transmitted by a partially transmissive mirror arranged in an inclined position in the path of the rays. The rays are additionally focused by a lens system (objective) on a certain point of the surface path of the moving body or on a reflecting surface behind the path of the moving body. With an unhindered optical path, the cone of rays is reflected from the reflecting surface or from a reflecting surface arranged on the surface of the moving body back to the objective, and from the objective, to the inclined semi-transparent mirror. The light rays which are deflected by the mirror and which are at least substantially parallel are focused by a lens system on a photosensitive element, such as a photocell. An interruption of the light rays by the moving body in the case of a reflecting surface arranged behind the moving body may be employed as a signal release or a reflective surface on the moving body may be suddenly brought into position to cause the rays to move in a direction to cause a signal operation. This latter arrangement is used, for example, where a supply of material can be determined on the moving body by releasing the reflecting surface when the supply is exhausted.

The multiple interruption of light rays used in the above method requires a comprehensive heavy, complicated and expensive lens system. In addition, the reflecting parts of the moving body (bright metal) or the material itself for example certain synthetic yarns or shuttle bobbins in looms can have a disturbing effect where the sudden reflection of the light rays must be used for a signal release.

In accordance with the present invention, the disadvantages of the known optical monitoring methods and apparatus are overcome and a simple light weight and space saving monitoring device is provided. With the invention, instead of using the originally parallel and subsequently focused and reflected light rays for influencing a photosensitive element and for releasing a signal when the autocollumation light barrier is moved. A cone formation of light rays is employed which is emitted from a more or less or practical punctiform light source and reflected with unbroken and divergent impingement on a reversing reflector in the direction of impingement and which releases a signal by actuating the photosensitive element.

A device for carrying out the method of the invention includes a more or less or practical punctiform light source, a partly transmissive mirror arranged obliquely to the axis of the cone of rays formed of unbroken light rays and emitted from the light source. A reversing reflector is employed on which the cone of rays impinges to reflect rays in a direction of impingement, and a photosensitive element is employed for releasing the control signal. The light source and the photosensitive element are arranged symmetrically with regard to the surface of the mirror facing the photosensitive element.

An object of the invention is to provide an improved method for monitoring movable bodies by means of a cone of light rays reflected from a surface and which releases a signal on a photosensitive element when the cone of rays is interrupted by a moving body.

A further object of the invention is to provide a device for monitoring moving bodies which includes a more or less or practical punctiform light source arranged adjacent a transmissive mirror which is located obliquely to the axis of the cone of rays which is formed of unbroken rays emitted from the light source, and including a reversing reflector carried by the moving body which reflect the rays backwardly in the direction of the impingement to the photosensitive element for releasing the signal, the light source and the photosensitive element being arranged symmetrically with regard to the surface of the mirror which faces the photosensitive element.

A further object of the invention is to provide an optical device for monitoring moving bodies which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

GENERAL DESCRIPTION OF THE PREFERRED EMBODIMENTS

Figure 1:
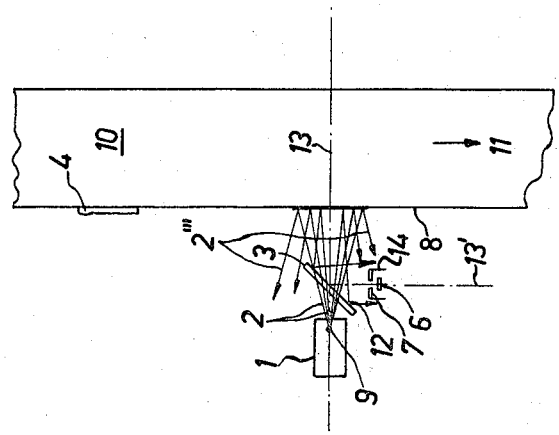
FIG. 1 is a schematic side elevational view of an optical device showing the optical characteristics without a reversing reflector employed for monitoring a moving body in accordance with the invention.

Referring to the drawing in particular, the invention embodied therein in FIG. 1, comprises a device for monitoring the movement of a body and which includes a lamp 1, having a more or less or practical punctiform light source 9 as, for example, a light emitting diode. The light source 9 radiates a cone of light rays with the extreme rays being shown at 2 and the axis of the rays being located at 13. A partially transmissive or semi-transparent mirror 3 extends across the optical path of the cone rays and is arranged obliquely to the axis 13. The portion of the light rays which extend along the axis 13, and which are transmitted through the mirror 3, is limited by the extreme rays 2' shown in FIG. 2 in rectilinear extension of the rays 2. A reversing reflector, for example, a reflective foil 4, is arranged on the surface 8 of the body 10. The body 10 moves in the direction of the arrow 11.

A photosensitive element 6, for example, the crystals of a photoelectric cell, is arranged in a holder 14 which is symmetrically positioned in respect to the light source 9 with regard to the surface 12 of the mirror 3 which faces the photosensitive element. Between the elements 6 and the mirror 3 on the line 13', which extends normal to the axis 13, there is symmetrically arranged a diaphragm 7.

Figure 2:
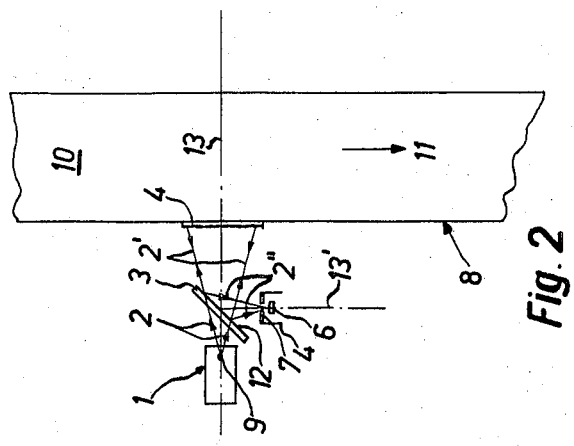
FIG. 2 is a view similar to FIG. 1 but showing the reversing reflector illuminated.

The method of operation of the device of the invention is as follows:

When the light rays transmitted by the semi-transparent mirror 3 fall from the cone of rays 2' shown in FIG. 2 on the non-reflective or like a mirror reflecting surface 8 of the body 10, as shown in FIG. 1, they are absorbed or reflected symmetrically to their direction of impingement with regard to the perpendicular to the surface 8 at their placement of the impingement. Unless surface 8 is concave with the curvature center at the point of the light source, the reflected cone remains divergent and the extreme rays are designated 2'''. As can be seen from FIG. 1, only a part of these rays is deflected in a divergent manner from the mirror 3 in the general direction toward the element 6 and of these rays, a major part is retained by the diaphragm 7. Only weak light will fall on the element 6 so that no signal is released. The diaphragm 7 also protects the element 6 from the interfering light.

When the reversing reflector 4 arrives, in the course of the movement of the body 10 in a direction of the arrow 11, under the illuminated area, as shown in FIG. 2, the light rays impinge on this surface and reflect it backwardly in the direction of impingement, that is, in a convergent manner. The cone of rays 2' falls back again on the partially transmissive mirror 3. The part not transmitted by the mirror 3 is likewise reflected convergently as a cone with limiting rays 2'', as shown in FIG. 2. The rays pass through the diaphragm 7 and fall as an intensive light on the photosensitive element 6 which is sufficiently influenced to release a signal.

Thanks to the absence of any optical lenses, the above described monitoring device is simple and may be made compactly and of lightweight. It requires only limited area extension of the reversing reflectors and it is very well suited for closely monitoring moving bodies on vibration-sensitive areas of machines, particularly as a yarn supply monitor for shuttle bobbins in looms.

While specific embodiments of the invention have been shown and described in detail to illustrate the application of the principles of the invention, it will be understood that the invention may be embodied otherwise without departing from such principles.

What is claimed is:

1. An optical method for monitoring moving bodies using a single substantially punctiform light source, a single photosensitive element, and a semi-transparent mirror, comprising directing the light rays from the light source through the semi-transparent mirror to the body, moving a reversing reflector with the body to interrupt the light rays and to reflect them backwardly in the direction of impingement to said semi-transparent mirror wherein the mirror is arranged to direct a major portion of the reflected light rays to a photosensitive element to cause a control signal to be generated.

2. An optical method for monitoring moving bodies, according to claim 1, wherein the mirror is arranged obliquely to the axis of the cone of light rays and it reflects light received from the reversing reflector in a convergent manner into a diaphragm leading to the photosensitive element.

3. A device for monitoring moving bodies, comprising a single substantially punctiform light source for generating a cone of light rays, a semi-transparent mirror arranged along the path of the generated light rays and being oblique to the axis of the cone of said rays, a moving body being adapted to move past the rays which pass through the semi-transparent mirror, a reversing reflector adapted to be carried by the moving body for reflecting light in the direction of impingement of the light thereon, and a single photoelectric element arranged symmetrically in respect to the light source and the mirror in a position to receive light rays which are deflected by the reversing reflector to the mirror and from the mirror to the photosensitive element.

4. A device for monitoring moving bodies, according to claim 3, including a member defining a diaphragm adjacent the photosensitive element, said semi-transparent mirror being constructed and arranged to reflect part of the light in a convergent manner into the diaphragm.

* * * * *